Patented June 15, 1954

2,681,345

UNITED STATES PATENT OFFICE 2,681,345

COLORING MATTERS OF THE TETRA-AZA-PORPHIN SERIES

Harold France, Blackley, Manchester, and William Owen Jones, Morden Park, England, assignors to Imperial Chemical Industries Limited, a corporation of Great Britain No Drawing. Application January 10, 1951, Serial No. 205,431

Claims priority, application Great Britain January 12, 1950

15 Claims. (Cl. 260—314)

This invention relates to new colouring matters and more particularly to new colouring matters of the tetra-aza-porphin series.

It is well known that metal and metal-free phthalocyanines are valuable blue pigments of considerable technical importance and that by introducing into the phenylene nuclei of the phthalocyanine molecule certain substituents, for example chlorine, greener pigments can be obtained. However, no satisfactory preparations have hitherto been described of technically useful pigments of analogous structure but with shades redder than those of the phthalocyanines.

Attempts have already been made to synthesise compounds containing the simple tetra-aza-porphin system (also known as the porphyrazine system) by treating nitrogenous derivatives of acids of the maleic series including maleic acids of the aliphatic and alicyclic series, with metallic reagents under conditions which result in the formation of phthalocyanines from the corresponding derivatives of phthalic acid but the only compounds containing the simple tetra-aza-porphin system whose synthesis from the corresponding maleic dinitrile which have yet been described are certain metal and metal-free octaphenyl-tetra-aza-porphins and their nuclear substituted derivatives obtained from diphenyl-maleic dinitrile and certain of its nuclear substituted derivatives.

Diphenylmaleic dinitrile is especially suitable for the preparation of a tetra-aza-porphin because it is stable in the cis form and even at 300° C., there is no detectable conversion into the trans form, but the octaphenyl-tetra-aza-porphins are dull greenish pigments of no commercial interest.

Small yields of alkyl-substituted tetra-aza-porphins have, however, been obtained from certain pyrrole derivatives, for example by treating 3-methyl-4-ethylpyrrole with bromine in the presence of ammonia or by heating 3-methyl-4-ethyl-pyrrole-2:5-diisocyanate with pyridine and tetramethyl-ammonium hydroxide, tetramethyl-tetra-aza-porphin has been obtained and from this the corresponding iron, copper and magnesium derivatives have been formed.

Hitherto no nickel or cobalt tetra-aza-porphins have been described. We have now found that nickel and cobalt tetra-aza-porphins and their alkyl- or cycloalkyl-substituted derivatives are valuable pigments because they have good fastness properties and they give bright shades which are much redder than those of the corresponding phthalocyanine compounds. Furthermore, contrary to what might be expected, the nickel and cobalt tetra-aza-porphins and their alkyl- or cycloalkyl-substituted derivatives are much redder in shade than the stable tetra-aza-porphins containing other common metals.

According to our invention therefore we provide as new colouring matters the nickel and cobalt tetra-aza-porphins and their alkyl- and cycloalkyl-substituted derivatives.

The new colouring matters of our invention may be represented by the formula:

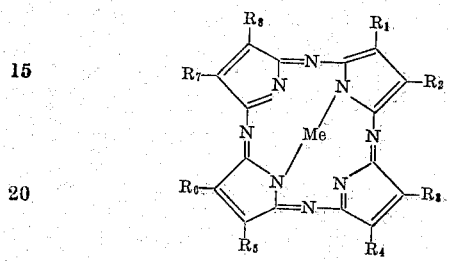

where $R_1$, $R_2$, $R_3$, $R_4$, $R_5$, $R_6$, $R_7$ and $R_8$, the substituents on the fundamental pyrrole nuclei, are hydrogen atoms or alkyl- or cycloalkyl-groups which may be the same or different and which may carry substituents and Me is nickel or cobalt.

The new compounds of our invention are violet colouring matters of high tinctorial strength and good fastness to light. They can be readily dispersed for more effective use by milling or grinding, for example by ball-milling the aqueous suspension or by milling with inorganic salts, or by dissolving in sulphuric acid and adding the acid solution to water or adding water to the acid solution.

The new compounds may be made by heating maleic dinitrile or an alkyl- or cycloalkyl-substituted maleic dinitrile or a mixture of any two or more of these dinitriles with nickel or cobalt or a compound of either of these.

The reaction may sometimes be brought about by simply heating the dinitrile with the metal, or metal compound, at a suitable temperature and the pigment may then be isolated by extracting it from the reaction product with a suitable solvent, for example dichlorobenzene. Alternatively the reaction may be conveniently effected by heating the reagents in a liquid diluent, for example nitrobenzene.

It is advantageous however to add to the above-mentioned reagents, ammonia or a salt thereof, an amine or a salt thereof, or an amide, for example urea, and improved results are obtained by adding a trace of a catalytic substance such as molybdenum or wolfram or a compound of either of these.

In place of the substituted maleic dinitrile, the corresponding fumaric dinitrile may sometimes be used. For example dimethyl maleic dinitrile (melting point 48° C.) and dimethyl fumaric dinitrile (melting point 81° C.) (which may both be obtained by dehydrating the cyanohydrin of α-methylaceto-acetonitrile and separating the two isomers by fractional distillation or crystallisation) both give pigments when heated with nickel or cobalt compounds. If desired a mixture of the substituted maleic and fumaric dinitriles may be used. It is suggested as a possible explanation of this that during the reaction the substituted fumaric dinitrile is converted to the corresponding maleic dinitrile.

Alternatively the new compounds containing substituted fundamental pyrrole nuclei and especially those in which each fundamental pyrrole nucleus is substituted by 2 alkyl- and/or cycloalkyl-groups, are conveniently made by heating the corresponding substituted maleic acid (when available) or a functional derivative thereof, with urea or a nitrogenous heat decomposition product thereof other than ammonia, and nickel or cobalt or a compound of either of these.

The reaction may be carried out in the presence of a catalyst especially a catalyst consisting of or containing molybdenum or wolfram, for example ammonium molybdate or sodium wolframate. The reaction is conveniently brought about by heating the reagents together in a medium which is liquid at the temperature of the reaction mixture, and it is sometimes advantageous to pass ammonia through the reaction mixture.

Suitable media are for example nitrobenzene, mono- or di-chlorobenzene, chloronaphthalene, quinoline, dimethylaniline, ethyl benzoate and kerosene.

As metal-containing substances which can be used in place of the metals themselves there may be mentioned oxides or salts, for example cobalt chloride, nickel chloride and nickel oxide.

The substituted maleic acid or functional derivative thereof may if desired be formed in situ in the reaction mixture, for example from the corresponding alkyl- or cycloalkyl-substituted malic acid or functional derivative thereof. As functional derivatives of the alkyl- or cycloalkyl-substituted maleic acids there may be used the corresponding amide, imide, dichloride or ammonium salt when these are available, or there may be used the mononitrile derived from the alkyl- or cycloalkyl-substituted maleic acid or the corresponding amide, or amonium salt when these are available. In general, however, it is preferred to use the anhydride of the alkyl- or cycloalkyl-substituted maleic acid, for example there may be used dimethylmaleic anhydride which may be made according to Ott (Berichte der Deutschen Chemischen Gesellschaft, 1928, volume 61, page 2131). If desired the alkyl or cycloalkyl groups may themselves carry substituents and it will be understood that mixtures of alkyl- or cycloalkyl-substituted maleic acids and/or mixtures of functional derivatives thereof may be used.

The reaction is generally found to proceed satisfactorily by heating the reagents together for several hours at temperatures as low as 130–150° C. The liquid medium may then be removed by distillation (in steam or under reduced pressure if desired), and the reaction product may be extracted with aqueous acid and/or alkali, washed and dried. The products may be further purified by crystallisation from a suitable solvent, for example dichlorobenzene.

The new compounds of our invention may sometimes be conveniently formed by heating the corresponding metal-free tetra-aza-porphin with nickel or cobalt or with a compound of either of these metals.

The invention is illustrated but not limited by the following examples in which the parts are by weight:

Example 1

A mixture of 3.78 parts of dimethylmaleic anhydride, 18.0 parts of urea, 1.5 parts of anhydrous nickel chloride, 0.6 part of ammonium molybdate and 35 parts of nitrobenzene is stirred at about 130° C. for 4 hours. 100 parts of 5% hydrochloric acid are then added and the mixture is steam distilled to remove nitrobenzene. The insoluble residue is filtered off, washed free from acid, treated with 100 parts of 2% caustic soda at 80—85° C. for a short time, again filtered off, washed alkali-free and dried. The nickel octamethyl-tetra-aza-porphin thus obtained is a deep purple solid which may be further purified for example by crystallising from o-dichlorobenzene from which solvent it separates in small bronze-purple prism-shaped crystals.

In place of nitrobenzene as diluent in the above example there may be used, monochlorobenzene, o-dichlorobenzene, quinoline, dimethylaniline, or ethyl benzoate, while the reaction may also be conducted in the absence of any diluent.

Nickel or an oxide of nickel may be used in the above example in place of nickel chloride and sodium wolframate may be used in place of ammonium molybdate.

In place of the 3.78 parts of dimethylmaleic anhydride used in the above example, there may be used 3.75 parts of the corresponding imide or 4.8 parts of the monoammonium salt of the corresponding monoamide, or 5.43 parts of dimethylmaleic acid dichloride or 4.86 parts of dimethylmalic acid or 3.72 parts of dimethylmaleic monoamide mononitrile (obtained by treating with ammonia the compound obtained by dehydrating the cyanohydrin of α-methylacetoacetic ester).

Example 2

A mixture of 3.78 parts of dimethylmaleic anhydride, 18 parts of urea, 1.5 parts of anhydrous cobaltous chloride, 0.6 part of ammonium molybdate and 35 parts of nitrobenzene is stirred at about 130° C. for 4 hours. 100 parts of 10% hydrochloric acid are added and the nitrobenzene is distilled off in steam. The insoluble residue is then filtered off and washed acid-free. This dark solid so obtained is stirred with 100 parts of 2% caustic soda at 80–85° C. for a short time and the undissolved pigment is filtered off, washed free from alkali and dried. The cobalt octamethyl-tetra-aza-porphin is a bronzy purple solid which may be further purified by crystallisation from o-dichlorobenzene from which solvent it separates in small bronzy needles.

Example 3

5.3 parts of dimethylmaleic dinitrile and 2.5 parts of anhydrous nickel chloride are heated together under pressure at 225–230° C. for 4 hours. The reaction product is stirred with ether and the mixture filtered. The black residue is ground to a powder and boiled with 100 parts of 5% hydrochloric acid then filtered off and washed free from acid. The residue is boiled for a short time with 100 parts of 2% caustic soda solution and then filtered off, washed free from alkali and dried. The product may be further purified by boiling it with o-dichlorobenzene and filtering when the new pigment separates from the deep purple-coloured solution in small bronze prism-shaped crystals.

*Example 4*

10.6 parts of dimethylmaleic dinitrile, 60 parts of urea, 5 parts of anhydrous nickel chloride and 2 parts of ammonium molybdate are mixed and heated at 160° C. under pressure for 3 hours. The reaction product is ground to a powder and heated with 150 parts of 5% hydrochloric acid at 85° C. for 10 minutes, and the solid in suspension is then filtered off, and washed free from acid. The residue is warmed with 150 parts of 2% caustic soda at 85° C. for 10 minutes and then filtered off, washed free from alkali and dried. The product is a bronze-iridescent black solid which may be further purified by crystallisation from o-dichlorobenzene.

*Example 5*

10.6 parts of dimethylmaleic dinitrile, 50 parts of urea, 5 parts of anhydrous nickel chloride, 1 part of ammonium molybdate and 70 parts of nitrobenzene are stirred together in an oil-bath at 155-160° C. for 4 hours. 150 parts of 5% hydrochloric acid are then added, the nitrobenzene is removed by steam-distillation and the insoluble black solid is filtered off and washed free from acid. It is purified by alkaline extraction and finally crystallised from o-dichlorobenzene as described in Example 3.

In place of the 5 parts of anhydrous nickel chloride used in the above example there may be used 5 parts of anhydrous cobalt chloride, when the corresponding cobalt pigment is obtained.

*Example 6*

2 parts of dimethylfumaric dinitrile and 1 part of anhydrous nickel chloride are heated together under pressure at 250-255° C. for 3 hours. The reaction product is purified as described in Example 3.

*Example 7*

In place of the 10.6 parts of dimethylmaleic dinitrile used in Example 4 there are used 10.6 parts of dimethylfumaric dinitrile and the reaction mixture is heated at 225° C. for 4 hours instead of at 160° C. for 3 hours. The product is isolated as described in Example 4.

*Example 8*

10.6 parts of dimethylfumaric dinitrile, 60 parts of urea, 5 parts of anhydrous nickel chloride, 2 parts of ammonium molybdate and 100 parts of kerosene are heated together under pressure at 200° C. for 3 hours. 150 parts of hydrochloric acid are added, the kerosene is removed by steam-distillation and the black solid residue is filtered off and washed free from acid. It is purified by alkaline extraction and crystallisation from o-dichlorobenzene as described in Example 3.

*Example 9*

10.6 parts of dimethylfumaric dinitrile, 60 parts of urea, 5 parts of anhydrous cobaltous chloride and 2 parts of ammonium molybdate are heated together under pressure at 200-210° C. for 3 hours. The reaction product is isolated as described in Example 4.

*Example 10*

12 parts of the mixture of methylethylmaleic and methylethylfumaric dinitrile (obtained by dehydration of methylethylmalic dinitrile) are heated with 60 parts of urea, 5 parts of anhydrous nickel chloride and 1 part of ammonium molybdate at 200° C. under pressure for 3 hours. The black product is then treated with acid and alkali as described in Example 4. The new pigment is extracted from the black residue with boiling monochlorobenzene and isolated as bronze crystals.

*Example 11*

A mixture of 8 parts of maleic dinitrile, 16 parts of urea, 8 parts of anhydrous nickel chloride, 1 part of ammonium molybdate and 120 parts of nitrobenzene is heated in an oil-bath at 145-150° C. for 1½ hours. 200 parts of 5% hydrochloric acid are added, the nitrobenzene is distilled off in steam and the insoluble matter is filtered off and washed free from acid. The black residue is stirred with 200 parts of 2% caustic soda at 90° C. for a short time and the undissolved material is filtered off, washed free from alkali and dried. The product dissolves in boiling o-dichlorobenzene to give a bright purple solution from which the pigment separates in small bronze needle-shaped crystals on cooling.

*Example 12*

7.8 parts of maleic dinitrile, 60 parts of urea, 5 parts of anhydrous nickel chloride and 2 parts of ammonium molybdate are heated together in a sealed tube at 160° C. for 3 hours. The black reaction product is worked up as described in Example 4 and the new pigment is extracted from the residue with boiling o-dichlorobenzene; it separates from the bright purple solution in small needle-shaped crystals.

*Example 13*

7.8 parts of maleic dinitrile and 10.6 parts of dimethylmaleic dinitrile are heated together with 50 parts of urea, 10 parts of anhydrous nickel chloride, 2 parts of ammonium molybdate and 120 parts of nitrobenzene at about 150° C. for 2 hours. The reaction product is isolated as described in Example 11 when small needle-shaped bronze crystals are obtained.

*Example 14*

A mixture of 10 parts of citraconic dinitrile (methylmaleic dinitrile), 15 parts of urea, 10 parts of nickel chloride, 1 part of ammonium molybdate and 100 parts of nitrobenzene is stirred at 150° C. for 1 hour. The reaction product is isolated as described in Example 11.

*Example 15*

1.5 parts of sodium are added to a solution of 4 parts of dimethylmaleic dinitrile in 40 parts of amyl alcohol. The solution is boiled for 1 hour and then cooled and the dark purple solid which separates is filtered off and washed with amyl alcohol. The sodium compound thus obtained is stirred with 200 parts of methyl alcohol for 2 hours at room temperature and the metal-free pigment thus formed is filtered off, and washed with methyl alcohol. The metal-free pigment is mixed with nickel acetate and the mixture is heated in boiling quinoline when the nicked octamethyl tetra-aza-porphin is formed.

In place of nickel acetate, cobalt acetate may be used.

Example 16

A mixture of 3.78 parts of dimethylmaleic anhydride, 27 parts of urea, 1.5 parts of anhydrous nickel chloride, 0.6 part of ammonia molybdate and 110 parts of nitrobenzene is stirred at 140° C. for 4 hours while a slow stream of dry ammonia is bubbled through the mixture. 200 parts of 5% hydrochloric acid are then added, the mixture is steam-distilled to remove nitrobenzene, and the insoluble product is then filtered off and washed free from acid. The residue is warmed with 100 parts of 2% caustic soda solution at 90° C. for 5 minutes and the undissolved material is filtered off, washed free from alkali and dried. The resulting deep purple powder is purified by dissolving it in 60 parts of 100% sulphuric acid, stirring the solution first at 25° C. for 1 hour and then at 90-95° C. for 1 hour, cooling the deep blue solution and pouring it on to 300 parts of crushed ice. The insoluble product is then filtered off, washed free from acid and stirred with 400 parts of 1% caustic soda solution at 75° C. for 10 minutes. The product is filtered off, washed free from alkali and dried. The purified pigment thus obtained forms a bronze-iridescent purple solid.

The above procedure may be modified by passing dry ammonia into a stirred solution of 3.78 parts of dimethylmaleic anhydride in 110 parts of nitrobenzene at 40° C. for 30 minutes. The white solid which separates re-dissolves with continued passage of ammonia when the mixture is heated to 140° C. and kept at 140° C. for 1 hour. 27 parts of urea, 1.5 parts of anhydrous nickel chloride and 0.6 part of ammonium molybdate are then added and the mixture is stirred for a further 3 hours at about 140° C. while ammonia gas is passed in. The reaction mixture is then worked up as described above.

Example 17

In place of the 3.78 parts of dimethylmaleic anhydride used in Example 1, 4.2 parts of methylethylmaleic anhydride are used when nickel tetra-methyl-tetraethyl-tetra-aza-porphin is obtained.

Example 18

In place of the 3.78 parts of dimethylmaleic anhydride used in Example 1, 4.62 parts of methyl-isopropylmaleic anhydride are used when nickel tetramethyl-tetraisopropyl-tetra-aza-porphin is obtained.

Example 19

In place of the 3.78 parts of dimethylmaleic anhydride used in Example 1, 5.04 parts of methyl-n-butylmaleic anhydride are used when nickel tetramethyl-tetra-n-butyl-tetra-aza-porphin is obtained.

Example 20

In place of the 3.78 parts of dimethylmaleic anhydride used in Example 1, 7.76 parts of methyl-cyclohexylmaleic anhydride are used and the mixture is heated at 150-155° C. instead of 130° C. Nickel tetramethyl-tetracyclohexyl-tetra-aza-porphin is obtained. The methylcyclohexylmaleic anhydride (melting point 135-136° C.) used as starting material is made by converting α-cyclohexylacetoacetic ester to the cyanohydrin, hydrolysing with hydrochloric acid and heating the methylcyclohexyl maleic acid formed.

Example 21

In place of the 3.78 parts of dimethylmaleic anhydride used in Example 1 there may be used a mixture of 1.89 parts of dimethylmaleic anhydride and 2.10 parts of methylethylmaleic when a mixed pigment is obtained.

What we claim is:

1. New colouring matters of the formula

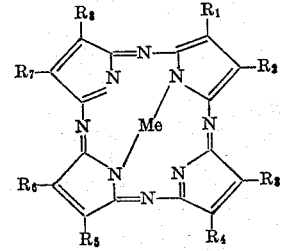

where R1, R2, R3, R4, R5, R6, R7 and R8, the substituents on the pyrrole nuclei are radicals selected from the group consisting of hydrogen, lower alkyl and cyclohexyl and Me is the radical of a metal selected from the group consisting of nickel and cobalt.

2. Nickel octa-lower-alkyl tetra-aza-porphins.
3. Cobalt octa-lower-alkyl tetra-aza-porphins.
4. Nickel octamethyl-tetra-aza-porphins.
5. Cobalt octamethyl-tetra-aza-porphins.
6. A process for the production of nickel and cobalt tetra-aza-porphins and their lower alkyl- and cyclohexyl-substituted derivatives which comprises heating at least one dinitrile selected from the group consisting of maleic dinitrile and lower alkyl- and cyclohexyl-substituted maleic dinitriles with a member selected from the group consisting of nickel, cobalt and the oxides and salts of these metals at a temperature of at least 130° C.
7. The process of claim 6, wherein the reactants are heated together in the presence of a nitrogen-containing compound selected from the group consisting of ammonia and urea.
8. The process of claim 6, wherein the reactants are heated together in the presence of a substance comprised of wolfram.
9. The process of claim 6, wherein the reactants are heated together in the presence of a substance comprised of molybdenum.
10. A process for the production of nickel and cobalt tetra-aza-porphins and their lower alkyl- and cyclohexyl-substituted derivatives which comprises heating at a temperature of at least 130° C., the corresponding metal-free tetra-aza-porphin with a substance comprised of a member seletced from the group consisting of nickel and cobalt and the oxides and salts of these metals.
11. A process for the production of nickel and cobalt lower alkyl and cyclohexyl-substituted tetra-aza-prophins which comprises heating at a temperature of at least 130° C., a maleic compound selected from the group consisting of the correspondingly substituted maleic acids, their anhydrides, amides, imides, dichlorides, ammonium salts, mononitriles and the amides and ammonium salts of said mononitriles, with urea and a member selected from the group consisting of nickel, cobalt and the oxides and salts of these metals.

12. The process of claim 11, wherein the reaction is carried out with a maleic anhydride.

13. The process of claim 11, wherein the reactants are heated together in the presence of a substance comprised of molybdenum.

14. The process of claim 11, wherein the reactants are heated together in the presence of a substance comprised of wolfram.

15. The process of claim 11, wherein ammonia is passed through the reaction mixture.

References Cited in the file of this patent

UNITED STATES PATENTS

| Number | Name | Date |
| --- | --- | --- |
| 2,213,726 | Wyler | Sept. 3, 1940 |

OTHER REFERENCES

Cook et al.: Journal Chemical Society (London), 1937, pp. 929–933.

Haddock: Jr. Soc. Dyers and Colourists, March 1945, pp. 68–73.